United States Patent
Adams

(10) Patent No.: US 7,858,715 B2
(45) Date of Patent: Dec. 28, 2010

(54) LOOP REACTOR FOR EMULSION POLYMERISATION

(75) Inventor: David Charles Adams, Darwen (GB)

(73) Assignee: Crown Brands Limited, Lancashire (GB)

(*) Notice: Subject to any disclaimer, the term of this patent is extended or adjusted under 35 U.S.C. 154(b) by 464 days.

(21) Appl. No.: 12/066,622

(22) PCT Filed: Sep. 11, 2006

(86) PCT No.: PCT/EP2006/066212

§ 371 (c)(1),
(2), (4) Date: Mar. 12, 2008

(87) PCT Pub. No.: WO2007/031478

PCT Pub. Date: Mar. 22, 2007

(65) Prior Publication Data

US 2008/0221283 A1    Sep. 11, 2008

(30) Foreign Application Priority Data

Sep. 12, 2005    (EP) .................................. 05255585

(51) Int. Cl.
  *C08F 2/00* (2006.01)
  *B01J 19/18* (2006.01)
(52) U.S. Cl. ............................ 526/64; 526/70; 526/68; 526/69; 422/132
(58) Field of Classification Search .................. 526/64, 526/68, 69, 70; 422/132
See application file for complete search history.

(56) References Cited

U.S. PATENT DOCUMENTS

| 3,052,664 | A | * | 9/1962 | Cleland et al. ................ 526/64 |
| 4,209,599 | A |   | 6/1980 | Brady et al. |
| 6,569,961 | B1 |   | 5/2003 | Adams |

FOREIGN PATENT DOCUMENTS

| EP | 0 096 201 | 12/1983 |
| EP | 0096201 | * 12/1983 |
| EP | 0 145 325 | 6/1985 |
| EP | 1 563 898 | 8/2005 |
| GB | 1 220 777 | 1/1971 |

OTHER PUBLICATIONS

International Search Report, PCT International Application No. PCT/EP2006/066212, dated Nov. 20, 2006.

* cited by examiner

*Primary Examiner*—William K Cheung
(74) *Attorney, Agent, or Firm*—Kenyon & Kenyon LLP

(57) ABSTRACT

Method of emulsion polymerization wherein a reactor comprising a closed reactor loop is continuously charged with fresh monomers and water phase at substantially the same rate as the rate of an overflow of reactor charge discharged into a secondary line section. The reactor charge is continuously recirculated within the reactor loop. The discharge rate and the circulation rate in the loop are balanced such as to result in a monomer content in the loop of less than 12 wt. %. The secondary line section has a volume of less than twice the volume of the reactor loop.

20 Claims, 1 Drawing Sheet

LOOP REACTOR FOR EMULSION POLYMERISATION

Figure 1:
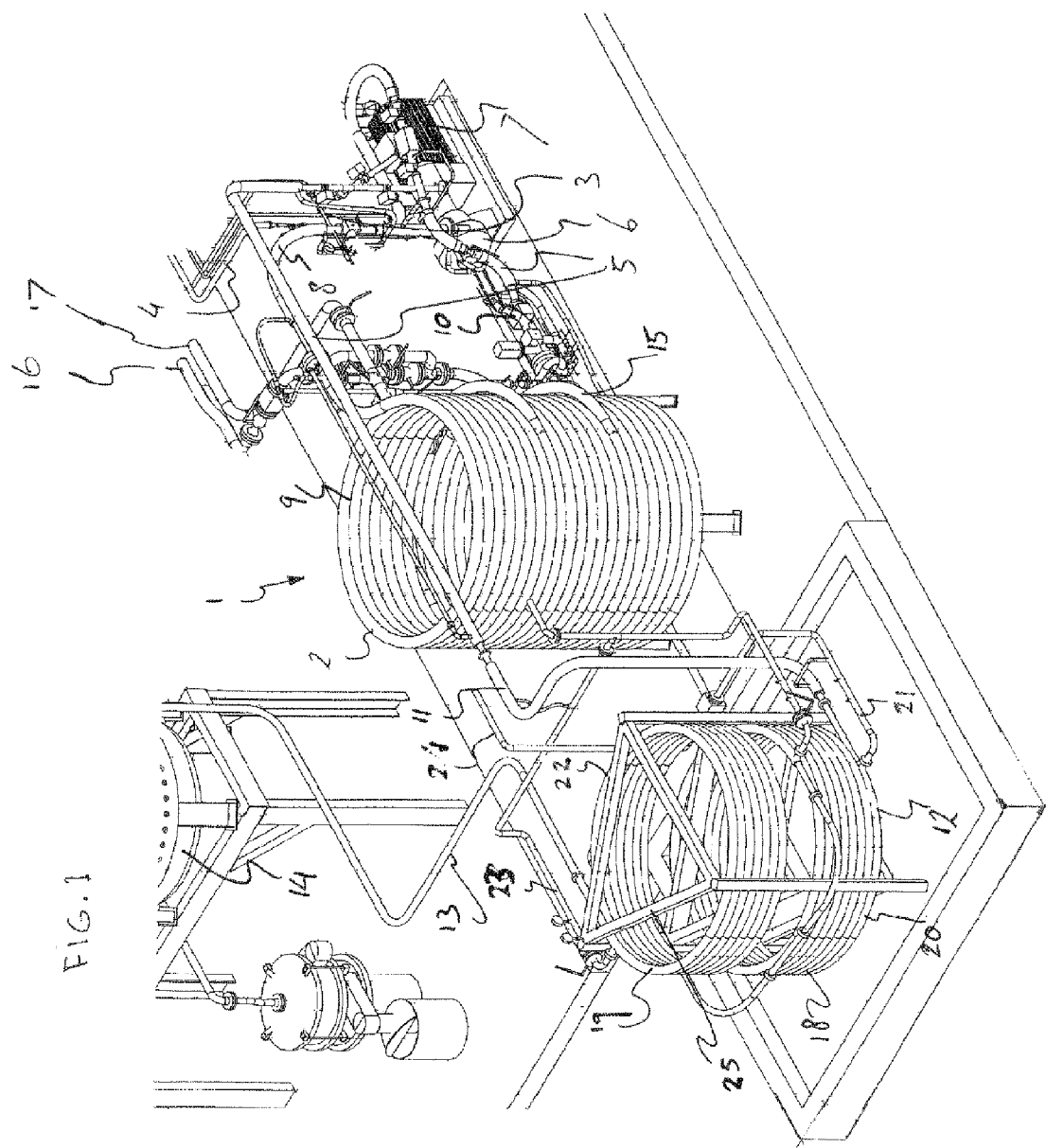

The present invention relates to emulsion polymerisation using a polymerisation reactor comprising a first section with a circulation loop with one or more inlets for raw material, a driving means, e.g. a circulation pump, for circulating a reactor charge within the circulation loop, and a discharge connected to a second line section. Water phase, or another suitable carrier, monomers, and optionally stabilisers are continuously fed to the loop and circulated. Polymer emulsion is continuously drawn off at the same rate at which the water phase and the monomers are fed into the reactor. Such reactors are particularly suitable for the production of polymers derived from vinyl and/or acrylic monomers, used for instance in paints or adhesives.

The polymer emulsion discharged from the circulation loop normally contains some unreacted monomer. Particularly at high production rates there is less time for reaction and the monomer content becomes higher. Generally for a satisfactory commercial operation, the unreacted monomer component in the product on arrival at the collection tank should not be higher than 1.0%. If it is above this level, further reaction in the tank increases hold-up time, fouling in the tank increases, and loss of monomer to the atmosphere is more likely.

EP-A 0 145 325 discloses a loop reactor for emulsion polymerisation discharging the polymer emulsion via a second section or plug section. The plug section allows further reaction of the unreacted monomer, resulting in a reduced monomer content in the final product. The plug section of this prior art loop reactor has a volume that is at least two thirds of the total volume of the reactor. In practice, such reactors were run with very high monomer concentrations. This resulted in low polymer particle sizes but also in heavy fouling encountered in the circulation loop and in a high residual monomer content of the emulsions overflowing into the plug section. According to EP-A 0 145 325, the residual monomer content can be as high as 20%. To reduce this residual monomer content in the final product, the volume of the plug section has to be at least twice the volume of the closed loop section.

It has also been tried to reduce the residual monomer content by optimising process conditions and the type and level of initiator according to the prior art as described in GB 1 220 777. However, using modern formulations that provide acceptable applications properties in paints, adhesives, etc., very low levels of initiator are often required coupled with low levels of stabiliser. In order to achieve good overall monomer conversion under these circumstances long reaction times are needed, e.g., mean residence times of 20 minutes or more, which is a serious economic drawback.

The object of the invention is to provide a tubular reactor for making emulsion polymers which minimises the residual monomer content as the product enters the collection tank and at the same time allows very high production rates in the recycle loop component.

The object of the invention is achieved by a method of emulsion polymerisation wherein a reactor comprising a closed reactor loop is continuously charged with fresh monomers and water phase at substantially the same rate as the rate at which an overflow of reactor charge is discharged into a secondary line section, the reactor charge being continuously re-circulated within the reactor loop, characterised in that the discharge rate and the circulation rate are balanced such as to result in a monomer content of less than 12 wt. % in the product being continuously discharged into the secondary line section, which has a volume of less than twice the volume of the reactor loop. Surprisingly, it was found that although the monomer contents are low, a balance can be reached between satisfactory particle sizes on the one hand and a minimised residual monomer content which is further reduced in the secondary section on the other. By reducing the mean residence time in the closed loop and increasing the residence time in the second section, substantially higher production rates were found to be possible over all other known tubular reactor systems. Further, it was found that no further initiator need be added to the second component at the onset, since an overflow of active initiator from the circulation loop enables the reaction to continue to nearly full monomer conversion.

U.S. Pat. No. 6,569,961 discloses a loop reactor for emulsion polymerisation which can comprise more than one loop in series. It also reports post-reaction of residual monomer content in a discharge line. It does not disclose a polymerisation method using a discharge rate and a secondary line section to obtain a minimised residual monomer content with low mean residence times while still leaving open the option to use low stabiliser levels.

The discharge rate can be arranged such that the mean residence time of the emulsion in the closed loop section is less than 12 minutes, e.g. 10 minutes or less.

Optionally, the secondary loop is coiled, resulting in a compact arrangement without sharp corners allowing cleaning by using pigs.

The second section can for example be provided with at least two separate cooling jackets in serial arrangement. This allows optimisation of the different stages of polymerisation when the reactor charge passes the second section. This way, the first part of the second line section can be cooled to a lesser extent than a subsequent second part of the second line section. The first part can for instance be cooled to a relatively high temperature of 70° C. or higher to maximise polymerisation, whereas the second section can be cooled to a greater extent, e.g., to 55° C. or less, so that the finished polymer emulsion is discharged to a storage tank at a reasonably low temperature.

Optionally, the second section may have a diameter which is larger than the diameter of the line forming the closed loop section. With a larger diameter, the reactor charge will move along the pipeline at a relatively slow speed. In another possible embodiment, the diameter of the second section can be smaller than the diameter of the pipeline forming the closed loop section, which will increase the shear rate.

Some typical monomers suitable for use in the present polymerisation process include, e.g., butyl acrylate, methyl methacrylate, styrene, vinyl acetate, Veova® 9, Veova® 10, Veova® 11 (all three ex Shell), ethyl acrylate, 2-ethyl hexyl acrylate, ethylene, and vinyl chloride. The addition reaction is initiated by radicals to give a dispersion of high-molecular weight polymer particles, usually of 50 to 3,000 nm in diameter, suspended in a medium in which the polymer is insoluble, usually water. Common free radical generators include the sodium, potassium, and ammonium salts of peroxodisulphuric acid, e.g. ammonium peroxodisulphate. Alternatively, redox couples can be used. These consist of an oxidising agent and a reducing agent. Commonly used oxidisers are the salts of peroxodisulphuric acid and t-butyl hydroperoxide and hydrogen peroxide itself. Reducers are sodium sulphite, sodium metabisulphite, sodium formaldehyde sulphoxylate, and sodium dithionate.

The polymerisation of monomers can take place in aqueous suspension and in that case raw materials are preferably provided by separate feed streams. These streams introduce fresh monomer and an aqueous solution of stabilisers known as the water phase or, e.g., a pre-emulsion of monomer and water with stabiliser and an aqueous solution in a separate small stream. At the start of the reaction the reactor is filled with water phase made up in a solution tank. Other fillings are also possible, particularly finished emulsion polymer (of the same or a different composition) from a previous run, optionally diluted to any concentration.

Agitation in the reactor is provided by virtue of the in-line circulation pump. Shortly after the feed streams start to flow, the monomers begin to react and heat is generated. The temperature is stabilised by cooling means, usually by controlled circulation of a cooling fluid (e.g. water) through a cooling jacket. The product flows to the cooling tank, where residual monomer converts to polymer. After cooling, the emulsion polymer is filtered to remove any oversize particles or gritty material in the strainer and transferred to the product storage tank.

Optionally, the polymerisation process may be carried out under pressure, for instance under a pressure of 10 to 150 bar. Alternatively, the polymerisation may be carried out at ambient pressure.

The invention is further illustrated by the drawing. In the drawing, FIG. 1 shows a loop reactor 1 for emulsion polymerisation. The reactor 1 comprises a circulation loop 2 with a monomer inlet 3, a water phase inlet 4, and a discharge outlet 5 for finished product. A circulation pump 6 driven by a motor 7 serves as a driving means for circulating a reactor charge within the circulation loop 2, via line 8 to the upper section of the coiled part 9 of the circulation loop 2. In the coiled part 9, the reactor charge flows down and via line section 10 back to the circulation pump, 6 where the main part of the reactor charge is recirculated again, except for the part that is discharged via outlet 5. The discharged reactor charge has a residual monomer content of about 5% by weight. To obtain a continuous polymerisation process, the outlet of the circulation loop 2 is dimensioned such that the outflow rate equals the inflow rate of the raw materials and is substantially less than the flow rate of the recirculated reactor charge.

The loop reactor 1 further comprises a product take-off line 11 leading from the outlet 5 of circulation loop 2 to a coiled second line section 12. A discharge line 13 leads from the coiled section 12 to a cooling tank 14. The volume of the coiled section 12 is about equal to the volume of the circulation loop 2.

The coiled tube of the circulation loop 2 is covered by a hollow cooling jacket 15, through which cooling water flows. The cooling jacket 15 is connected to a cooling water inlet 16 and a cooling water outlet 17.

The coiled after-cooler 12 is similarly cooled and has a lower part 18 and a separately cooled upper part 19. To this end, the lower part 18 is provided with a cooling jacket 20, connected to a water inlet 21 and a water outlet (not shown). Similarly, the upper part 19 is provided with a separate cooling jacket 22, connected to another water outlet 23 and a water inlet 24. The lower part 18 of the after-cooler 12 is connected to the discharge outlet 5 of the circulation loop 2 and is cooled to a lesser extent than the subsequently cooled upper part 19 of the after-cooler 12. The coiled after-cooler 12 is hung in a frame 25.

The invention claimed is:

1. A method of emulsion polymerisation comprising
continuously charging a reactor comprising a closed loop section and a secondary line section not forming a closed loop and having one end connected to a discharge opening of the loop section with fresh monomers and water phase at substantially the same rate as the rate of discharge into the secondary line section, and
continuously re-circulating the reactor charge within the loop section,
characterised in that the discharge rate and the circulation rate in the loop section are balanced such as to result in a monomer content in the loop of less than 12 wt. %, the secondary line section being coiled and having a volume from 50%-100% of the volume of the closed loop section.

2. The method according to claim 1, characterised in that the mean residence time in the closed reactor loop is less than 12 minutes.

3. The method according to claim 1, characterised in that a first part of the secondary line section is cooled to a lesser extent than a subsequently cooled second part of the secondary line section.

4. A polymerisation reactor comprising a first section with a circulation loop with one or more inlets for raw material, a driving means for circulating a reactor charge within the circulation loop, and a second line section not forming a closed loop connected to a discharge of the loop section, characterised in that said second line section is coiled and has a volume from 50%-100% of the volume of the closed loop section.

5. The reactor according to claim 4, characterised in that the second line section is provided with at least two separate cooling jackets in serial arrangement.

6. The reactor according to claim 5, wherein said second line section has a diameter larger than the diameter of the line forming the circulation loop.

7. The reactor according to claim 5, wherein said second line section has a diameter smaller than the diameter of the line forming the circulation loop.

8. The method according to claim 2, characterised in that the mean residence time in the closed reactor loop is 10 minutes or less.

9. The method according to claim 2, characterised in that a first part of the secondary line section is cooled to a lesser extent than a subsequently cooled second part of the secondary line section.

10. The method according to claim 8, characterised in that a first part of the secondary line section is cooled to a lesser extent than a subsequently cooled second part of the secondary line section.

11. The method according to claim 3, characterised in that the first part of the secondary line section is cooled to a temperature of 70° C. or higher, and the second part of the secondary line section is cooled to a temperature of 55° C. or less.

12. The method according to claim 9, characterised in that the first part of the secondary line section is cooled to a temperature of 70° C. or higher, and the second part of the secondary line section is cooled to a temperature of 55° C. or less.

13. The method according to claim 10, characterised in that the first part of the secondary line section is cooled to a temperature of 70° C. or higher, and the second part of the secondary line section is cooled to a temperature of 55° C. or less.

14. The method according to claim 1, characterised in that the method is carried out under a pressure of 10 to 150 bar.

15. The method according to claim 13, characterised in that the method is carried out under a pressure of 10 to 150 bar.

16. The method according to claim 1, characterised in that the method is carried out at ambient pressure.

17. The method according to claim 13, characterised in that the method is carried out at ambient pressure.

18. The reactor according to claim 4, wherein said driving means is a circulation pump.

19. The reactor according to claim 6, wherein said driving means is a circulation pump.

20. The reactor according to claim 7, wherein said driving means is a circulation pump.

* * * * *